(12) United States Patent
Lackner et al.

(10) Patent No.: US 9,387,433 B2
(45) Date of Patent: Jul. 12, 2016

(54) METHODS AND SYSTEMS FOR CAPTURING CARBON DIOXIDE FROM DILUTE SOURCES

(75) Inventors: Klaus Lackner, Dobbs Ferry, NY (US); Allen Wright, Tucson, AZ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 199 days.

(21) Appl. No.: 13/983,313

(22) PCT Filed: Feb. 6, 2012

(86) PCT No.: PCT/US2012/023929
§ 371 (c)(1),
(2), (4) Date: Mar. 4, 2014

(87) PCT Pub. No.: WO2012/106703
PCT Pub. Date: Aug. 9, 2012

(65) Prior Publication Data
US 2014/0219899 A1    Aug. 7, 2014

Related U.S. Application Data

(60) Provisional application No. 61/439,518, filed on Feb. 4, 2011.

(51) Int. Cl.
| | | |
|---|---|---|
| *B01D 53/02* | (2006.01) | |
| *B01D 53/62* | (2006.01) | |
| *B01D 53/75* | (2006.01) | |
| *B01D 53/14* | (2006.01) | |
| *B01D 53/26* | (2006.01) | |

(52) U.S. Cl.
CPC ............. *B01D 53/62* (2013.01); *B01D 53/75* (2013.01); *B01D 53/1475* (2013.01); *B01D 53/261* (2013.01); *B01D 2252/204* (2013.01); *B01D2253/206* (2013.01); *B01D 2257/504* (2013.01); *B01D 2258/0283* (2013.01); *Y02C 10/04* (2013.01)

(58) Field of Classification Search
CPC ................... B01D 2252/204; B01D 2253/206; B01D 2257/504; B01D 2258/0283; B01D 53/1475; B01D 53/261; B01D 53/62; B01D 53/75; Y02C 10/04
See application file for complete search history.

(56) References Cited

U.S. PATENT DOCUMENTS

| | | | |
|---|---|---|---|
| 2,592,762 | A | 4/1952 | Taylor et al. |
| 3,282,831 | A | 11/1966 | Hamm |
| 5,352,345 | A | 10/1994 | Byszewski et al. |
| 2008/0031801 | A1 | 2/2008 | Lackner et al. |
| 2009/0232861 | A1 | 9/2009 | Wright et al. |
| 2011/0011261 | A1 | 1/2011 | Jenness et al. |

OTHER PUBLICATIONS

International Search Report and the Written Opinion of the International Searching Authority, International Application No. PCT/US2012/023929, filed May 23, 2012.

*Primary Examiner* — Christopher P Jones
(74) *Attorney, Agent, or Firm* — Anthony P. Gangemi; Murtha Cullina LLP

(57) ABSTRACT

Methods and systems for capturing carbon dioxide from dilute sources are disclosed. In some embodiments, the methods include the following: (a) directing a first substantially gaseous stream including a first amount of carbon dioxide to a primary scrubber; (b) in the primary scrubber, removing a portion of the first amount of carbon dioxide thereby forming a second substantially gaseous stream including a second amount of carbon dioxide; (c) directing the second substantially gaseous stream to a secondary scrubber; (d) in the secondary scrubber, removing a portion of the second amount of carbon dioxide thereby forming a third substantially gaseous stream; (e) mixing substantially all of the portion of the second amount of carbon dioxide removed in step (d) with the first substantially gaseous stream before it enters the primary scrubber; and (f) repeating steps (a) thru (e).

20 Claims, 3 Drawing Sheets

METHODS AND SYSTEMS FOR CAPTURING CARBON DIOXIDE FROM DILUTE SOURCES

CROSS REFERENCE TO RELATED APPLICATION(S)

This application claims the benefit of U.S. Provisional Application No. 61/439,518, filed Feb. 4, 2011, which is incorporated by reference as if disclosed herein in its entirety.

BACKGROUND

If the carbon dioxide concentration of the atmosphere is to be stabilized, one must capture and store carbon dioxide from all types of power plants. Natural gas-fired turbines and other dilute sources should not be exempt from carbon dioxide capture and storage. It is simply not sufficient to collect carbon dioxide only from coal fired power plants. Unfortunately, collecting carbon dioxide from low concentrations in the gas stream, requires a strong sorbent that is typically expensive to regenerate. This already poses a problem for conventional flue gas scrubbing in a coal-fired power plant.

Even though the initial concentration of carbon dioxide in the flue gas of a coal fired power plant is well above ten percent, a thorough scrubber will have to drive the carbon dioxide concentration well below one percent. However, it is difficult for sorbent-based flue-gas scrubbers to capture more than 80 to 90 percent of the carbon dioxide produced. This is not good enough to achieve the 80 percent economy-wide reduction in carbon dioxide emissions that will be necessary over the next few decades. Extraction from more dilute sources and lowering the residual carbon dioxide concentrations released at coal-fired power plants are required to increase the overall amount of carbon dioxide captured.

Most of the research and development for capture technologies at large sources of carbon dioxide are focused on the high concentrations that are available at coal combustion plants. These limited concentrations range typically from ten to fifteen percent carbon dioxide by volume. Flue gas scrubbing of carbon dioxide is usually accomplished in a single step. However, in most designs there is a prior scrubbing stage to remove sulfur and other sour gases from the flue gas. This is necessary because most carbon dioxide sorbents are irreversibly fouled by sulfites and sulfates.

SUMMARY

Aspects of the disclosed subject matter include methods and systems for capturing carbon dioxide from dilute sources. Aspects of the disclosed subject matter include a carbon dioxide booster pump that transfers carbon dioxide from the downstream side of the conventional sorbent system back to its upstream side, until all the carbon dioxide in the system has been captured. Sorbent materials that can efficiently collect carbon dioxide from a gas stream and drive partial pressures of carbon dioxide well below that of ambient air are used. When exposed to moisture, these sorbents release the carbon dioxide creating a partial pressure of about 0.05 bar, high enough for a conventional sorbent to capture the carbon dioxide.

Conventional scrubber systems are augmented with an innovative secondary scrubber system that extends the capture range to much lower partial pressures of carbon dioxide. A moisture-sensitive sorbent that in its dry state readily absorbs carbon dioxide, reducing its partial pressure to well below that in ambient air, is utilized. In a wet state, the sorbent releases carbon dioxide as long as the partial pressure stays below 5 percent of an atmosphere. Aspects of the disclosed subject matter include the use of a conventional scrubber as the primary scrubber, whose output is further polished by the secondary sorbent, which drives the carbon dioxide concentration of the exhaust stream well below that of ambient air. The discharge from the secondary sorbent during its regeneration step is then released back upstream and scrubbed again by the primary scrubber.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Some embodiments of the disclosed subject matter include a combined system having a conventional primary carbon dioxide scrubber and secondary scrubber system. The secondary scrubber system removes low-concentration, residual carbon dioxide from the flue gas stream before it is exhausted to the atmosphere. The carbon dioxide captured is then released further upstream into the flue gas stream. The primary scrubber system is capable of driving carbon dioxide concentrations well below the release concentration of the new secondary sorbent, which then removes the residual carbon dioxide from the stream. During regeneration of the secondary sorbent, which is accomplished by wetting the material, the carbon dioxide is released into a gas stream and returned to the primary sorbent. The secondary cycle therefore acts as a carbon dioxide booster pump, capable of concentrating carbon dioxide by two orders of magnitude with minimal energy inputs.

For the secondary carbon dioxide sorbent, an anionic exchange resin is selected that is originally in a hydroxide or a carbonate form. When it is dry, the resin selected spontaneously loads up with carbon dioxide from air. Even the 400 ppm of carbon dioxide in the air is more than enough to drive the loading state of the resin near that of bicarbonate. In the fully loaded state, substantially every positive ion embedded into the polymer matrix is holding onto a carbon dioxide molecule. Given a density of 1.7 moles of charge per kg of dry resin, this represents a significant concentration of carbon dioxide on the resin, approximately 7.5% by weight.

Simply wetting the resin, by exposing it either to low-grade steam or to water, results in a release of half of the carbon dioxide molecules that are bound to the resin. The wet resin conventional aqueous chemistry prevails and the resin falls back from the bicarbonate to the carbonate form. Thus, one can release about 0.85 mol of carbon dioxide per kg of resin in a single swing. In practice, however, the swing is limited to about 0.25 mol/kg, since in effect we are relying on the middle part of the swing, which is much faster, both in uptake and release of the carbon dioxide.

Drying the resin allows one to repeat the process, and it seems to be possible to repeat the cycle virtually indefinitely.

The process has an increasing advantage over MEA-based processes as the carbon dioxide concentration in the gas stream is lowered. Thus, it is best applied at lower concentrations, i.e., below 1% of carbon dioxide, and in combination with conventional sorbents, which can drive the carbon dioxide concentration in the gas down to this level.

Figure 1:
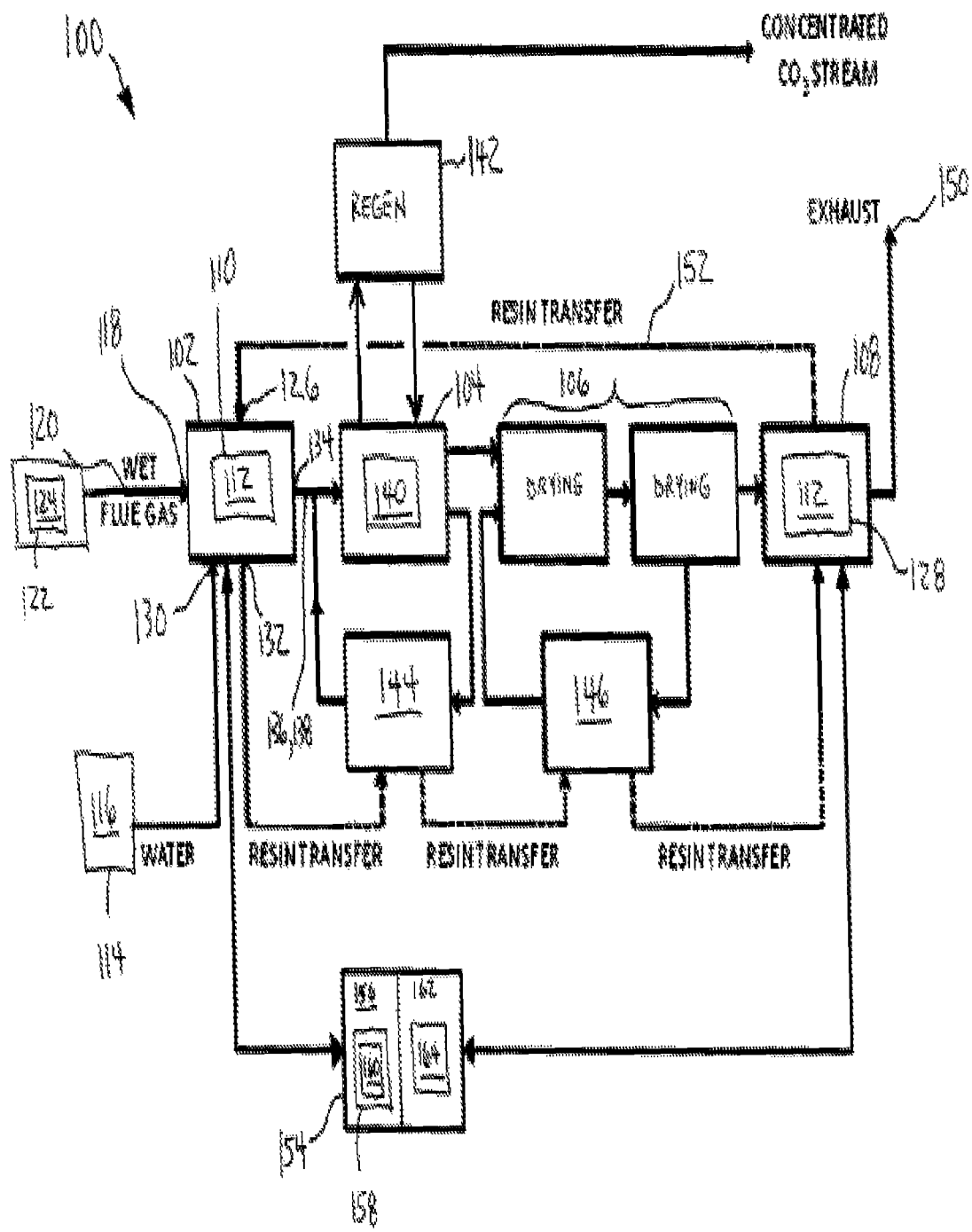
FIG. 1 is a schematic diagram of methods and systems according to some embodiments of the disclosed subject matter.
Figure 2:
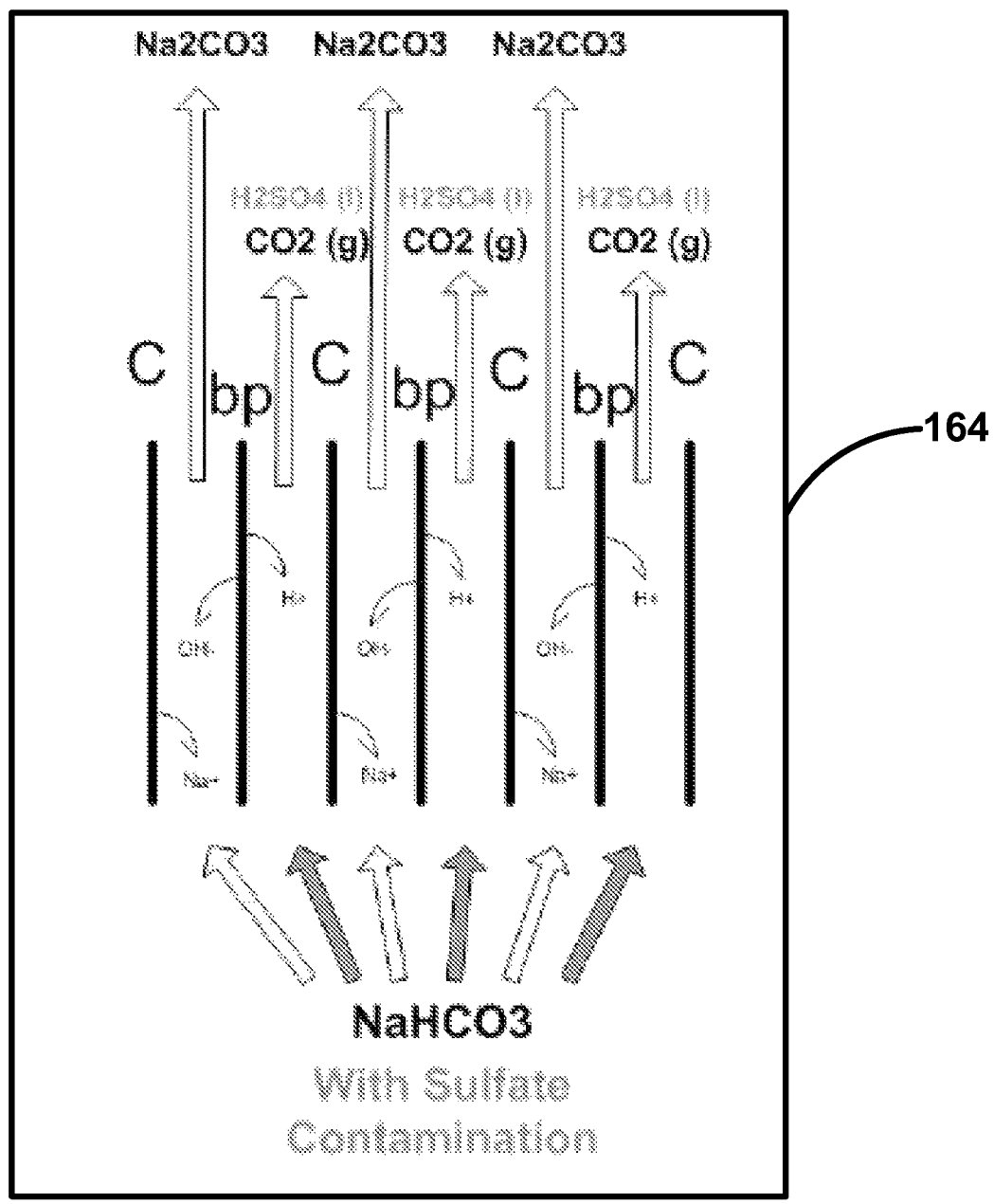
FIG. 2 is a schematic diagram of methods and systems according to some embodiments of the disclosed subject matter.

Referring now to FIGS. 1 and 2, some embodiments include a system 100 for capturing carbon dioxide from dilute sources such as a wet flue gas stream. System 100 includes a sorbent wetting and primary unloading unit 102, a conventional primary sorbent unit 104, drying units 106, and a secondary sorbent unit 108, all of which are in fluid communication with one another.

Sorbent wetting and primary unloading unit 102 includes a first amount 110 of a secondary sorbent 112, a supply 114 of water 116, an inlet 118 for receiving a wet flue gas stream 120 that includes a first amount 122 of carbon dioxide 124, an inlet 126 for receiving a second amount 128 of the secondary sorbent, an inlet 130 for receiving the water, an outlet 132 for transferring the secondary sorbent after it is wetted with the water, and an outlet 134 for releasing the wet flue gas stream, which contains a second amount 136 of carbon dioxide 138 that includes the first amount of carbon dioxide and carbon dioxide unloaded from the secondary sorbent. In some embodiments, system 100 is configured so that flue gas stream 120 bypasses sorbent wetting and primary unloading unit 102, which then only serves to wet secondary sorbent 112.

In some embodiments, secondary sorbent 112 is an anionic exchange resin, e.g., a quaternary amine or similar. For a quaternary amine, one can view the functional group as an NH4+ ion in which all four hydrogen atoms have been replaced with a carbon chain. Because there are no hydrogen atoms left in the functional group, the amine cannot donate a proton, and it therefore always remains in the positive state. Hence the resin is referred to as a strong-base resin. The wet resin typically contains 1.3 mole of cationic charge per kg of resin. A fully hydrated form of the resin has more weight. In some embodiments, the resin has a measured cation concentration of 1.7 mol per kg in the dry state.

The resins are typically purchased in the chloride form and are washed in a carbonate solution in order to transform them into the carbonate form. For example, the resin can be washed in a one molar solution and the carbonate to bicarbonate ratio of ions on the resin matches the ratio in the solution within a few percent. The resin in the chloride form does not take up carbon dioxide.

A resin after washing in sodium hydroxide will readily absorb carbon dioxide. It has been confirmed that the uptake of carbon dioxide is not on residual hydroxide solution by carefully washing the resin in deionized water. The resin works well even after washing in deionized water and the uptake rate does not diminish after multiple washings in deionized water.

In its wet state the resin unloads carbon dioxide into the flue gas stream. If the carbon dioxide concentration of the flue gas stream is low, the resin discharge will boost it to about 5% carbon dioxide by volume. If the stream is already rich in carbon dioxide, the resin will only capture other sour gases that are associated with stronger acids than carbonic acid, e.g. SO2, SO3 and NO2 by displacing carbonate ions on the resin.

Conventional primary sorbent unit 104 is in fluid communication with sorbent wetting and primary unloading unit 102. Conventional primary sorbent unit 104 includes a primary sorbent 140 for removing a substantial portion of second amount 136 of carbon dioxide 138 from wet flue gas stream 120 that is received from sorbent wetting and primary unloading unit 102. In some embodiments, primary sorbent 140 includes a monoethanolamine solution. In some embodiments, system 100 includes a primary sorbent regeneration unit 142 in fluid communication with conventional primary sorbent unit 104. Primary sorbent 140 is cycled back and forth between conventional primary sorbent unit 104 and primary sorbent regeneration unit 142.

In some embodiments, system 100 includes a secondary unloading unit 144 in fluid communication with sorbent wetting and primary unloading unit 102 and conventional primary sorbent unit 104. In some embodiments, a substantial amount of carbon dioxide is unloaded from secondary sorbent 112 in secondary unloading unit 144.

Dying units 106 are in fluid communication with conventional primary sorbent unit 104 for substantially drying wet flue gas stream 120. In some embodiments drying units 106 include a chiller. In some embodiments, system 100 includes a sorbent drying unit 146 in fluid communication with secondary unloading unit 144, at least one of drying units 106, and secondary sorbent unit 108.

Secondary sorbent unit 108 is in fluid communication with drying units 106. Secondary sorbent unit 108 includes second amount 128 of secondary sorbent 112 for removing substantially all of a remaining portion of carbon dioxide in wet flue gas stream 120 received from drying units 106. In some embodiments, system 100 includes an exhaust stack 150 in fluid communication with secondary sorbent unit 108 for exhausting wet flue gas stream 120 after it has passed through the secondary sorbent unit.

System 100 includes a conduit 152 for transferring second amount 128 of secondary sorbent 112, which is loaded with carbon dioxide, from secondary sorbent unit 108 to sorbent wetting and primary unloading unit 102.

In some embodiments, system 100 includes a secondary sorbent regeneration unit 154 in fluid communication with sorbent wetting and primary unloading unit 102 and secondary sorbent unit 108. In some embodiments, secondary sorbent regeneration unit 154 includes a rinsing station 156 having a supply 158 of rinsing fluid 160 and a rinsing fluid regeneration station 162 including an electrodialytic salt splitter device 164.

Washing the secondary sorbent resin in a sodium carbonate solution will wash the ions on the resin into solution enriching it with bicarbonate or any other ion present on the resin. After the wash is completed, the rinsing fluid which carries away sulfides, sulfites, sulfates, nitrates, and other impurity anions, can now be regenerated at rinsing fluid regeneration station 162. Referring now to FIG. 2, rinsing fluid regeneration station 162 includes an electrodialytic salt splitter device 164. Electrodialytic salt splitter device 164 is used to separate the sulfur contamination from the bicarbonate/carbonate process stream using a combination of cationic (C) and bipolar (bp) membranes. The transfer of ions is results in the concentration of sulfur contaminants in the acid effluent stream.

Still referring to FIG. 2, electrodialytic salt splitter device 164 can be viewed as two separate flow systems, the alkaline fluid and the acidic fluid. The alkaline reservoir starts out as sodium bicarbonate and the current flow drives sodium ions from the acidic reservoir to the alkaline reservoir, converting the brine to a sodium carbonate brine. On the acidic side one enters a mixture of carbonate, bicarbonate and other anions. The electrodialysis removes sodium ions from the acid compartment, replacing them with protons.

As a result, the brine becomes gradually more acidic. To the extent that it still contains carbonate/bicarbonate ions, the acidification will first convert carbonates to bicarbonates and then release gaseous carbon dioxide, which is of course captured even though it only represents a tiny percentage of the total amount of carbon dioxide captured at the plant. On the base side, the bipolar membrane provides OH- ions that are, however, immediately neutralized against the proton donated by the bicarbonate present. Thus, on the base side, one is generating a carbonate brine.

In some embodiments, liquid is directly injected into the acidic compartment, but not into the basic department. There is no liquid outflow from the acidic compartments, and no direct inflow into the base compartment. This is possible because the membranes not only allow the passage of cations from the acid side to the base side, but they also act as osmotic membranes that let water pass from the low concentration brine to the high concentration brine, i.e., from the acid side to the base. Thus, all of the major constituents enter the system on the acid side and leave on the base side. The only exception is the carbon dioxide, which leaves the acid compartment by bubbling out as a gas. This results in the dilution of the strength of this brine. The sodium ions moving to the base compartment further dilute the acidic brine, and increase the brine strength on the base side, which leads to a net flow of water from the acid compartment to the base compartment. This process regenerates the carbonate brine that is used to wash the membranes, and it delivers the nitrates and sulfates at a relatively pure stream of clean acids that can then be processed further for commercial uses.

Figure 3:
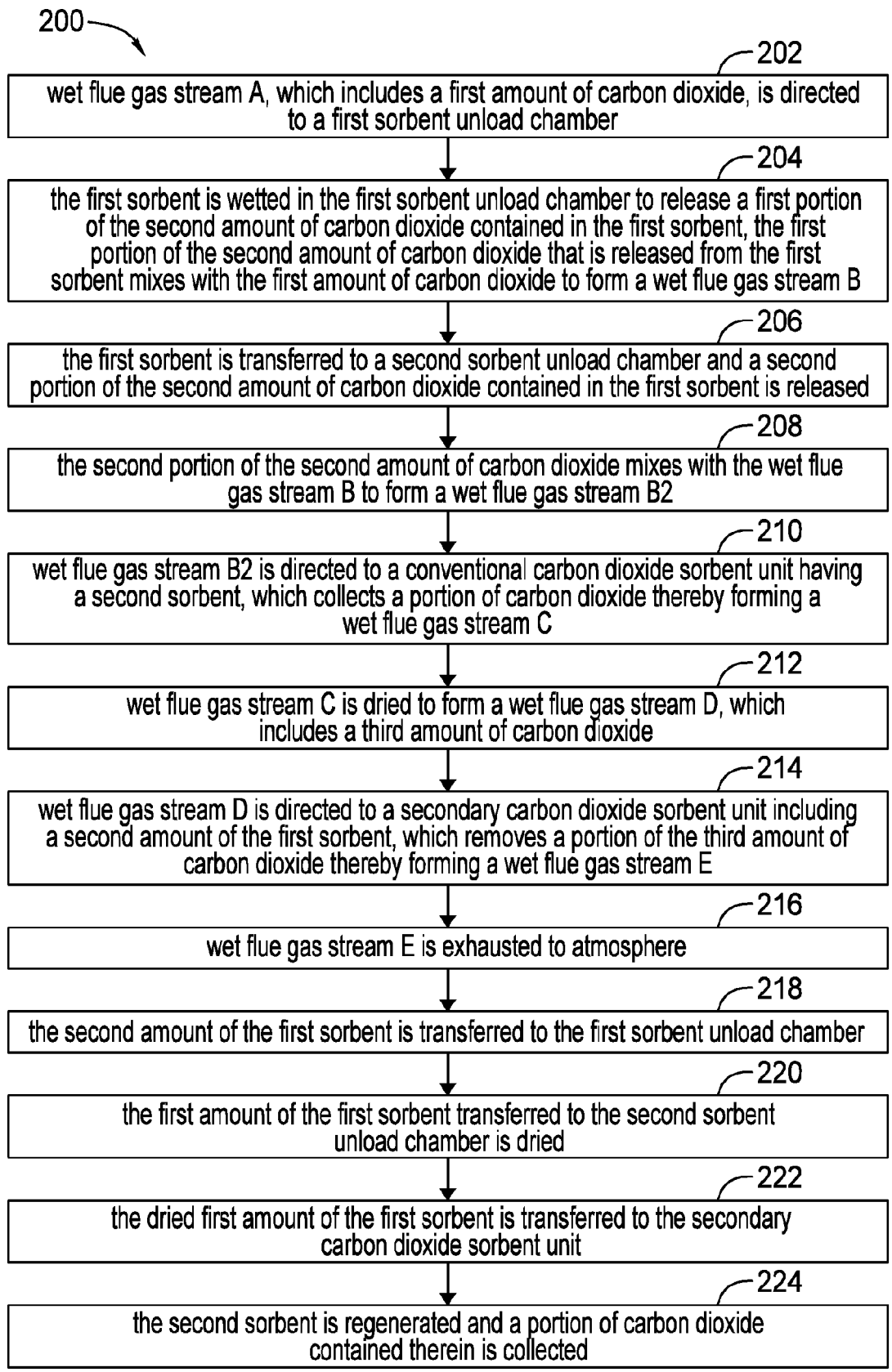
FIG. 3 is a chart of a method according to some embodiments of the disclosed subject matter.

Referring now to FIG. 3, some embodiments of the disclosed subject matter include a method 200 for capturing carbon dioxide from dilute sources. At 202, wet flue gas stream A, which includes a first amount of carbon dioxide, is directed to a first sorbent unload chamber. The first sorbent unloading chamber includes a first amount of a first sorbent containing a second amount of carbon dioxide. In some embodiments, the first sorbent is an anionic exchange resin, e.g., a quaternary amine or similar. At 204, the first sorbent is wetted in the first sorbent unload chamber to release a first portion of the second amount of carbon dioxide contained in the first sorbent. Still at 204, the first portion of the second amount of carbon dioxide that is released from the first sorbent mixes with the first amount of carbon dioxide to form a wet flue gas stream B.

At 206, the first sorbent is transferred to a second sorbent unload chamber and a second portion of the second amount of carbon dioxide contained in the first sorbent is released. At 208, the second portion of the second amount of carbon dioxide mixes with the wet flue gas stream B to form a wet flue gas stream B2. At 210, wet flue gas stream B2 is directed to a conventional carbon dioxide sorbent unit having a second sorbent, which collects a portion of carbon dioxide thereby forming a wet flue gas stream C. In some embodiments, the second sorbent includes a monoethanolamine solution.

At 212, wet flue gas stream C is dried to form a wet flue gas stream D, which includes a third amount of carbon dioxide. At 214, wet flue gas stream D is directed to a secondary carbon dioxide sorbent unit including a second amount of the first sorbent, which removes a portion of the third amount of carbon dioxide thereby forming a wet flue gas stream E. At 216, wet flue gas stream E is exhausted to atmosphere. At 218, the second amount of the first sorbent is transferred to the first sorbent unload chamber. At 220, the first amount of the first sorbent transferred to the second sorbent unload chamber is dried. At 222, the dried first amount of the first sorbent is transferred to the secondary carbon dioxide sorbent unit. At 224, the second sorbent is regenerated and a portion of carbon dioxide contained therein is collected. Although not shown, some embodiments include regenerating the first sorbent.

Methods and systems according to the disclosed subject matter offer benefits and advantages over known technology. Methods and systems according to the disclosed subject matter offer a novel approach to capture carbon dioxide from dilute streams ranging from 400 ppm (as in air) to 150,000 ppm (15%) in a coal-fired power plant. Methods and systems according to the disclosed subject matter extend the range of sorbent technologies compared to those relying on conventional sorbents to lower carbon dioxide concentrations by creating a moisture swing-based carbon dioxide booster pump that transfers carbon dioxide from the downstream side of the conventional sorbent system back to its upstream side. In the process, the carbon dioxide concentration can be boosted as much as 200-fold, which is sufficient for another scrubbing by the conventional sorbent. As a result, the conventional sorbent can collect virtually all of the carbon dioxide from a flue gas stream even though by itself it need not be able to reduce the carbon dioxide concentration below 1 or 2%. This process promises to be more energy efficient than conventional MEA based approaches and also provides a simple means of dealing with small acid gas impurities in the gas stream.

The potential impact of the methods and systems according to the disclosed subject is large. In short, it makes it possible to eliminate carbon dioxide emissions no matter how dilute. Conventional scrubbers augmented by a carbon dioxide booster pump could scrub all the carbon dioxide from the flue stack of a coal fired power plant; they could remove the carbon dioxide from a natural gas turbine; or even remove carbon dioxide from the air that is pulled through the cooling tower of a nuclear power plant. When and where to scrub will become an economic decision tied to the price of carbon.

Methods and systems according to the disclosed subject matter allow a high concentration stream to be scrubbed to far lower exit concentrations than current designs, and also allow for the scrubbing of gas streams having an initial concentration that is below the threshold for a primary sorbent.

Methods and systems according to the disclosed subject matter have the potential of dramatically reducing carbon dioxide emissions from a large variety of sources without greatly increasing the cost of the capture process. The booster pump action of the moisture swing requires very little energy and is very cost effective. Furthermore, its presence makes it possible to relax the design constraints that are currently put on the primary scrubber, reducing the cost in the primary scrubber system. Therefore, there may be very little cost associated with the additional benefit of increased performance of the system.

Methods and systems according to the disclosed subject matter offer the following advantages over conventional MEA-based systems:

1. Because of the booster pump concept (see FIG. 1), one can operate the conventional sorbent cycle at a significantly higher carbon dioxide concentration than the average carbon dioxide concentration currently seen in an MEA cycle. As a result, the disclosed technology will improve the kinetics and operate with a more compact contactor or move to a physical adsorbent with greatly reduced binding energy. This will translate into a cost reduction for the conventional sorbent cycle;

2. Using the dilute carbon dioxide capture resin, the disclosed technology can drive the carbon dioxide concentration in the flue gas far lower than otherwise feasible. Hence, total carbon dioxide reductions of 99% or more are possible. This may prove necessary in a world that wants to stabilize carbon dioxide.

3. Technology according to the disclosed subject matter can deal with flue gases with substantially lower initial carbon dioxide concentration as the booster pump concept is independent of the initial carbon dioxide concentration and are therefore able to deal with exhaust gases from natural gas-fired power plants and any other process that produces carbon dioxide concentrations that exceed the carbon dioxide concentration in air.

4. Technology according to the disclosed subject matter includes means of scrubbing out low levels of acidic gases before the flue gas gets in contact with the conventional scrubbing agent and thus can avoid fouling MEA or whatever sorbent is used.

Use of the moisture swing limits the energy consumption in the overall process. The major cost is due to the need to cool down the flue gas in order to dry the gas. This suggests that sorbent processes that already rely on low temperatures, e.g., the selexol process, may be particularly well adapted for this kind of integration.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A system for capturing carbon dioxide from dilute sources, said system comprising:
    a sorbent wetting and primary unloading unit including a first amount of a secondary sorbent, a supply of water, an inlet for receiving a wet flue gas stream that includes a first amount of carbon dioxide, an inlet for receiving a second amount of said secondary sorbent, an inlet for receiving water from said supply of water, an outlet for transferring said secondary sorbent after it is wetted with water from said supply of water, and an outlet for releasing said wet flue gas stream containing a second amount of carbon dioxide that includes said first amount of carbon dioxide and carbon dioxide unloaded from said secondary sorbent;
    a conventional primary sorbent unit in fluid communication with said sorbent wetting and primary unloading unit, said conventional primary sorbent unit including a primary sorbent for removing a substantial portion of said second amount of carbon dioxide from said wet flue gas stream that is received from said sorbent wetting and primary unloading unit;
    drying units in fluid communication with said conventional primary sorbent unit for substantially drying said wet flue gas stream;
    a secondary sorbent unit in fluid communication with said drying units, said secondary sorbent unit including said second amount of said secondary sorbent for removing substantially all of a remaining portion of carbon dioxide in said wet flue gas stream received from said drying units; and
    a conduit for transferring said second amount of said secondary sorbent loaded with carbon dioxide from said secondary sorbent unit to said sorbent wetting and primary unloading unit.

2. The system of claim 1, further comprising:
    an exhaust stack in fluid communication with said secondary sorbent unit.

3. The system of claim 1, further comprising:
    a primary sorbent regeneration unit in fluid communication with said conventional primary sorbent unit.

4. The system of claim 1, further comprising:
    a secondary sorbent regeneration unit in fluid communication with said sorbent wetting and primary unloading unit and said secondary sorbent unit.

5. The system of claim 4, said sorbent regeneration unit comprising:
    a rinsing station including a supply of rinsing fluid; and
    a rinsing fluid regeneration station including an electrodialytic salt splitter device.

6. The system of claim 1, further comprising:
    a secondary unloading unit in fluid communication with said primary unloading unit and said conventional primary sorbent unit.

7. The system of claim 5, further comprising:
    a sorbent drying unit in fluid communication with said secondary unloading unit, at least one of said drying units, and said secondary sorbent unit.

8. The system of claim 1, wherein said secondary sorbent is an anionic exchange resin.

9. The system of claim 8, wherein said anionic exchange resin a quaternary amine.

10. The system of claim 1, wherein said primary sorbent includes a monoethanolamine solution.

11. A method for capturing carbon dioxide from dilute sources, said method comprising:
    directing wet flue gas stream A, which includes a first amount of carbon dioxide, to a first sorbent unload chamber, said first sorbent unload chamber including a first amount of a first sorbent containing a second amount of carbon dioxide;
    wetting said first sorbent in said first sorbent unload chamber to release a first portion of said second amount of carbon dioxide contained in said first sorbent, which mixes with said first amount of carbon dioxide to form wet flue gas stream B;
    transferring said first sorbent to a second sorbent unload chamber;
    releasing a second portion of said second amount of carbon dioxide contained in said first sorbent;
    mixing said second portion of said second amount of carbon dioxide with said wet flue gas stream B to form wet flue gas stream B2;
    directing wet flue gas stream B2 to a conventional carbon dioxide sorbent unit having a second sorbent thereby collecting a portion of carbon dioxide and forming a wet flue gas stream C;
    drying wet flue gas stream C to form a wet flue gas stream D, which includes a third amount of carbon dioxide;
    directing wet flue gas stream D to a secondary carbon dioxide sorbent unit including a second amount of said first sorbent thereby removing a portion of said third amount of carbon dioxide and forming a wet flue gas stream E;
    exhausting said wet flue gas stream E from said system;
    transferring said second amount of said first sorbent to said first sorbent unload chamber;
    drying said first amount of said first sorbent transferred to said second sorbent unload chamber;
    transferring said dried first amount of said first sorbent to said secondary carbon dioxide sorbent unit; and
    regenerating said second sorbent and collecting a portion of carbon dioxide contained therein.

12. The method of claim 11, further comprising:
    regenerating said first sorbent.

13. The method of claim 11, wherein said first sorbent is an anionic exchange resin.

14. The method of claim 13, wherein said anionic exchange resin a quaternary amine.

15. The method of claim 11, wherein said second sorbent includes a monoethanolamine solution.

16. A method for capturing carbon dioxide from dilute sources, said method comprising:
  (a) directing a first substantially gaseous stream including a first amount of carbon dioxide to a primary scrubber;
  (b) in said primary scrubber, removing a portion of said first amount of carbon dioxide thereby forming a second substantially gaseous stream including a second amount of carbon dioxide;
  (c) directing said second substantially gaseous stream to a secondary scrubber;
  (d) in said secondary scrubber, removing a portion of said second amount of carbon dioxide thereby forming a third substantially gaseous stream;
  (e) mixing substantially all of said portion of said second amount of carbon dioxide removed in step (d) with said first substantially gaseous stream before it enters said primary scrubber; and
  (f) repeating steps (a) thru (e).

17. The method according to claim 16, wherein removing in steps (b) and (d) include absorbing carbon dioxide into sorbents.

18. The method of claim 17, further comprising:
  regenerating said sorbents; and
  collecting carbon dioxide contained in said sorbents.

19. The method of claim 18, wherein regenerating includes wetting and drying said sorbents.

20. The method according to claim 16, further comprising:
  exhausting said third substantially gaseous stream to atmosphere.

* * * * *